US011985477B2

(12) United States Patent
Delgado, Jr.

(10) Patent No.: US 11,985,477 B2
(45) **Date of Patent: *May 14, 2024**

(54) HORN-LOADED LOUDSPEAKER

(71) Applicant: Klipsch Group, Inc., Indianapolis, IN (US)

(72) Inventor: Rogelio Delgado, Jr., Hope, AR (US)

(73) Assignee: Klipsch Group, Inc., Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/939,075

(22) Filed: Sep. 7, 2022

(65) Prior Publication Data

US 2023/0030850 A1 Feb. 2, 2023

Related U.S. Application Data

(63) Continuation of application No. 17/390,100, filed on Jul. 30, 2021, now Pat. No. 11,470,417.

(51) Int. Cl.

| | |
|---|---|
| ***H04R 1/30*** | (2006.01) |
| ***H04R 1/26*** | (2006.01) |
| ***H04R 1/28*** | (2006.01) |
| ***H04R 1/34*** | (2006.01) |

(52) U.S. Cl.

CPC ............. *H04R 1/2865* (2013.01); *H04R 1/26* (2013.01); *H04R 1/2803* (2013.01); *H04R 1/2819* (2013.01); *H04R 1/2842* (2013.01); *H04R 1/30* (2013.01); *H04R 1/345* (2013.01); *H04R 2201/34* (2013.01)

(58) Field of Classification Search

CPC . H04R 1/023; H04R 1/26; H04R 1/30; H04R 1/2819; H04R 1/2834; H04R 1/2842; H04R 1/345; H04R 1/2857; H04R 1/2865; H04R 2201/029; H04R 2201/34; H04R 2499/15; H04R 1/021; H04R 2499/11

See application file for complete search history.

(56) References Cited

U.S. PATENT DOCUMENTS

| | | | | |
|---|---|---|---|---|
| 3,356,179 | A | 12/1967 | Tompkins | |
| 3,608,665 | A | 9/1971 | Drisi | |
| 4,146,111 | A | 3/1979 | Mae et al. | |
| 4,215,761 | A | 8/1980 | Andrews | |
| 4,224,469 | A * | 9/1980 | Karson | H04R 5/02 381/349 |
| 4,286,688 | A | 9/1981 | OMalley | |

(Continued)

FOREIGN PATENT DOCUMENTS

EP 3398351 B1 2/2020

*Primary Examiner* — Huyen D Le

(74) *Attorney, Agent, or Firm* — Quarles & Brady LLP

(57) ABSTRACT

According to an aspect of the disclosure, a loudspeaker includes an enclosure having a front sidewall that is disposed between a first acoustic opening and a second acoustic opening. The loudspeaker further includes a motorboard comprising a first opening arranged along a plane and a second opening arranged along the plane, an active driver, and a passive component. The active driver is arranged concentric to the first opening to transmit sound waves directly through the first opening toward the front sidewall. In addition, the passive component is arranged concentric to the second opening to transmit sound waves directly through the second opening toward the front sidewall.

19 Claims, 12 Drawing Sheets

(56) References Cited

U.S. PATENT DOCUMENTS

| | | | | | |
|---|---|---|---|---|---|
| 4,314,620 | A | | 2/1982 | Gollehon | |
| 4,349,084 | A | * | 9/1982 | Karpodines | H04R 1/26<br>181/146 |
| 4,437,540 | A | | 3/1984 | Murakami et al. | |
| 4,730,694 | A | * | 3/1988 | Albarino | H04R 1/2888<br>181/147 |
| 4,733,749 | A | | 3/1988 | Newman | |
| 4,923,031 | A | | 5/1990 | Carlson | |
| 5,115,883 | A | | 5/1992 | Morikawa | |
| 5,258,584 | A | | 11/1993 | Hubbard | |
| 5,278,361 | A | | 1/1994 | Field | |
| 5,313,525 | A | | 5/1994 | Klasco | |
| 5,324,896 | A | * | 6/1994 | Magnani | H04R 1/24<br>181/146 |
| 5,526,456 | A | | 6/1996 | Heinz | |
| 5,898,138 | A | | 4/1999 | Delgado, Jr. | |
| 7,590,257 | B1 | | 9/2009 | Blanchard | |
| 7,743,878 | B1 | | 6/2010 | Moore | |
| 7,760,899 | B1 | | 7/2010 | Graber | |
| 8,807,269 | B1 | * | 8/2014 | Lucy | H04R 1/2888<br>181/148 |
| 11,470,417 | B1 | * | 10/2022 | Delgado, Jr. | H04R 1/2865 |
| 2008/0110692 | A1 | | 5/2008 | Moore | |
| 2014/0093113 | A1 | | 4/2014 | Dix et al. | |

* cited by examiner

HORN-LOADED LOUDSPEAKER

RELATED APPLICATIONS

This application is based on, claims priority to, and incorporates by reference herein in its entirety U.S. patent application Ser. No. 17/390,100, filed on Jul. 30, 2021, and entitled "Horn-Loaded Loudspeaker."

BACKGROUND

The range of hearing for a young person typically includes sound frequencies having wavelengths from approximately 20 Hz to approximately 20 kHz. The upper limit typically falls with age to approximately 10-15 kHz. In speaker design, ideally only a single speaker would be used, which could faithfully reproduce sound over the full range of audible wavelengths. This is generally considered an impractical solution, in part because different loudspeaker characteristics are desirable for reproducing sound at different wavelengths. For example, it is typically desirable to have a driver diaphragm that has less mass at higher frequencies and more mass at lower frequencies.

Similarly, it is typically desirable to have a driver magnet having less mass for reproducing sounds at lower frequencies and having more mass for reproducing sounds at higher frequencies. Because the different properties that are desirable for reproducing sound waves have different frequencies, multiple or different drivers are typically used for reproducing different ranges of frequencies. For example, a sub-woofer may be used to reproduce sound waves having frequencies of approximately 80-100 Hz or less. A woofer is typically used to reproduce sound waves having frequencies from approximately 80 Hz to approximately 400 Hz or 800 Hz. Some woofers are used to reproduce sound waves having frequencies that are as high as approximately 1200 Hz. Mid-range drivers are typically used to reproduce sounds from approximately 300 Hz to approximately 7 kHz, and tweeters are typically used to reproduce sounds from approximately 1500 Hz to approximately 20 kHz.

Loudspeakers using horn loading or using a bass reflex system are known in the art, each design offering its own advantages and disadvantages. In a horn loudspeaker, a horn is typically an angled or curved tube with a gradually increasing cross-sectional area that shapes and directs sound that radiates from the horn. Typically, a horn is made of metal, plastic, and/or wood. In designing a horn for a loudspeaker, the curvature of the horn sidewalls is typically determined using a selected mathematical equation or formula depending upon the desired characteristics of the loudspeaker.

Horn-loaded loudspeakers offer a number of advantages. For example, a horn-loaded speaker, in which a horn is placed in front of a driver, such as a woofer, is a highly efficient speaker, providing relatively high sound pressure levels with relatively low power input. To better understand the improved efficiency and the directivity of a horn-loaded loudspeaker, it may be helpful to visualize the effect that a megaphone has on cheers or instructions shouted or spoken into it. If the horn is well designed, then the horn-loaded speaker also offers a smooth frequency response. Although they offer many advantages, horn-loaded speakers are not without problems. When the size of the loudspeaker is a concern, a horn-loaded speaker is relatively large, particularly when the speaker is designed to extend into lower frequencies.

In a bass reflex or vented box type system, a vent is added to a closed box that typically has a direct radiation driver, and the vent is tuned so that the sound radiating from the vent effectively adds to the direct sound from the driver. A bass reflex system provides good low frequency extension, improving the driver response near the low cut-off frequency, particularly for woofers. Venting such as is done in a bass reflex system provides the most benefits for drivers reproducing low frequency sound waves and does not provide as significant benefits for drivers reproducing higher frequency sound waves, such as tweeters and mid-range drivers. When size is a concern, a relatively small bass reflex system can offer good performance, particularly for a speaker designed to extend into lower frequencies. A bass reflex system, however, is relatively inefficient and has higher distortion than a well-designed horn-loaded system.

What is therefore desired is an improved horn-loaded loudspeaker design.

SUMMARY

In an example embodiment, a loudspeaker includes an enclosure. The enclosure includes a first plurality of sidewalls. The loudspeaker further includes a horn. The horn is defined in part by the first plurality of sidewalls. The horn includes a second plurality of sidewalls that are coupled to the first plurality of sidewalls and that include a first sidewall and a second sidewall. The horn further includes a motorboard that includes a first opening arranged along a plane and a second opening arranged along the plane. The motorboard is coupled to the first sidewall and the second sidewall. The loudspeaker further includes an active driver arranged concentric to the first opening to transmit sound waves directly through the first opening, and a passive component arranged concentric to the second opening to transmit sound waves directly through the second opening.

In another example embodiment, a loudspeaker includes an enclosure and a motorboard. The motorboard includes a first opening and a second opening. The first opening and the second opening are co-planar. The center point of the first opening and the center point of the second opening define a center line. A center plane extends through the center line and orthogonal to a planar surface of the motorboard. The center plane defines a first part of the enclosure and a second part of the enclosure. The loudspeaker further includes a first acoustic passage disposed in the first part of the enclosure. The first acoustic passage extends from the center plane, around a first panel, and to a first opening of the enclosure. The loudspeaker further includes an active driver arranged concentric to the first opening to transmit sound waves directly through the first opening, and a passive component arranged concentric to the second opening to transmit sound waves directly through the second opening.

In some aspects, a loudspeaker includes an enclosure having a front sidewall that is disposed between a first acoustic opening and a second acoustic opening. The loudspeaker further includes a motorboard comprising a first opening arranged along a plane and a second opening arranged along the plane, an active driver, and a passive component. The active driver is arranged concentric to the first opening to transmit sound waves directly through the first opening toward the front sidewall. In addition, the passive component is arranged concentric to the second opening to transmit sound waves directly through the second opening toward the front sidewall.

In some aspects, a loudspeaker includes an enclosure, a motorboard, a center plane, an active driver, and a passive component. The motorboard comprises a first opening that defines a first center point and a second opening that defines a second center point. The first opening and the second opening are co-planar. The center plane is orthogonal to a planar surface of the motorboard and defines a first part of the enclosure and a second part of the enclosure. The first center point is intersected by the center plane and the second center point is offset from the center plane. The active driver is arranged concentric to the first opening to transmit sound waves directly through the first opening. In addition, the passive component arranged concentric to the second opening to transmit sound waves directly through the second opening.

In some aspects, a loudspeaker includes an enclosure; a motorboard, an active driver, a first passive component, and a second passive component. The motorboard includes a first opening that defines a first center point and a second opening that defines a second center point. The first opening and the second opening are co-planar. The active driver is arranged concentric to the first opening to transmit sound waves directly through the first opening. The first passive component is arranged concentric to the second opening to transmit sound waves directly through the second opening. In addition, the second passive component is arranged concentric to a third opening to transmit sound waves directly through the third opening. The third opening defines a third center point that is arranged collinearly with the second center point along a width of the motorboard.

In some aspects, a loudspeaker includes an enclosure; a motorboard, an active driver, a first passive component, and a second passive component. The motorboard includes a first opening that defines a first center point and a second opening that defines a second center point. The first opening and the second opening are co-planar. The active driver is arranged concentric to the first opening to transmit sound waves directly through the first opening. The first passive component is arranged concentric to the second opening to transmit sound waves directly through the second opening. In addition, the second passive component is arranged concentric to a third opening to transmit sound waves directly through the third opening. The third opening defines a third center point that is arranged collinearly with the second center point along a length of the motorboard.

DETAILED DESCRIPTION

Figure 1:
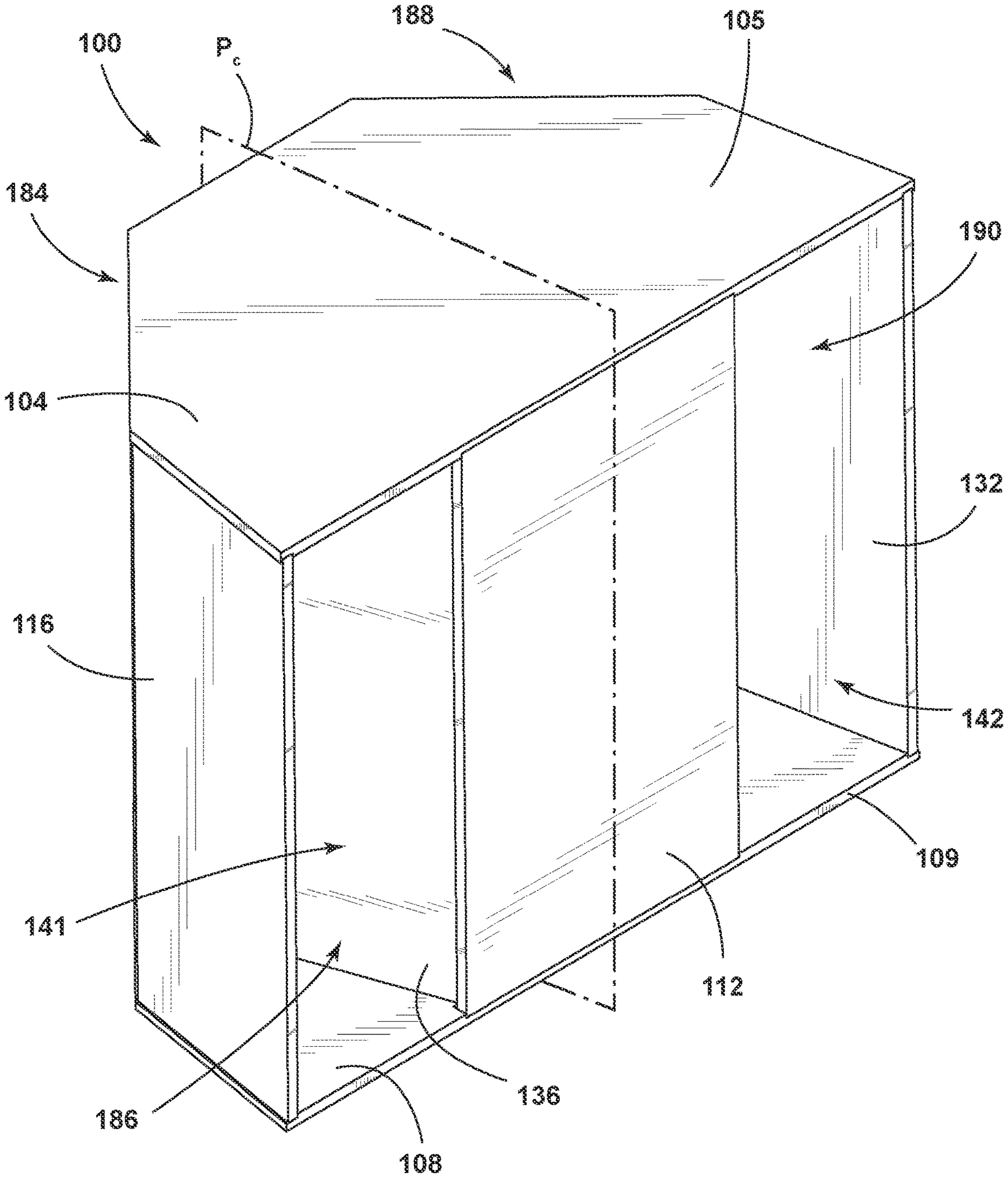
FIG. 1 is a top left perspective view of an exemplary loudspeaker.
Figure 2:
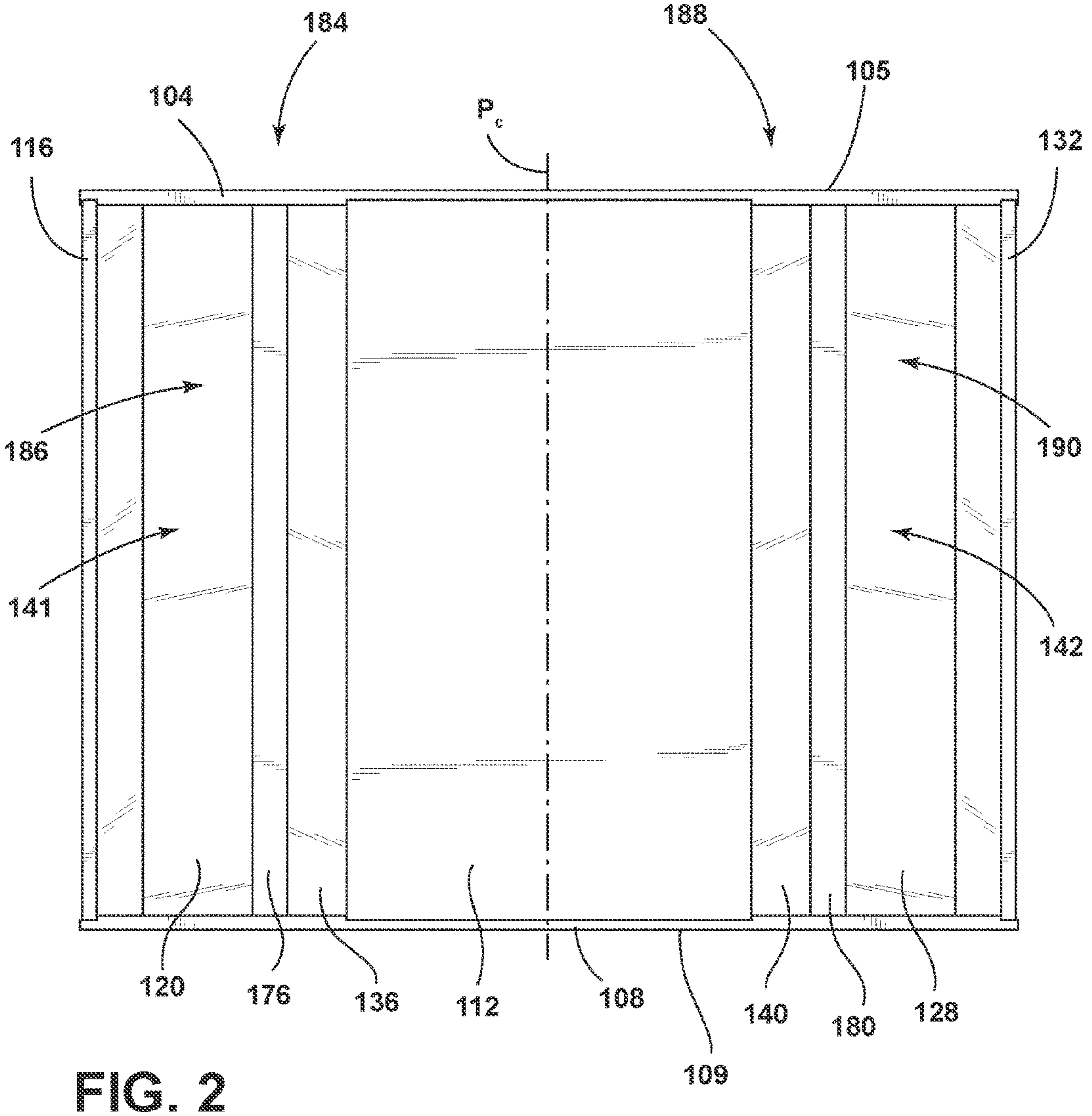
FIG. 2 is a front elevation view of the loudspeaker in FIG. 1.
Figure 3:
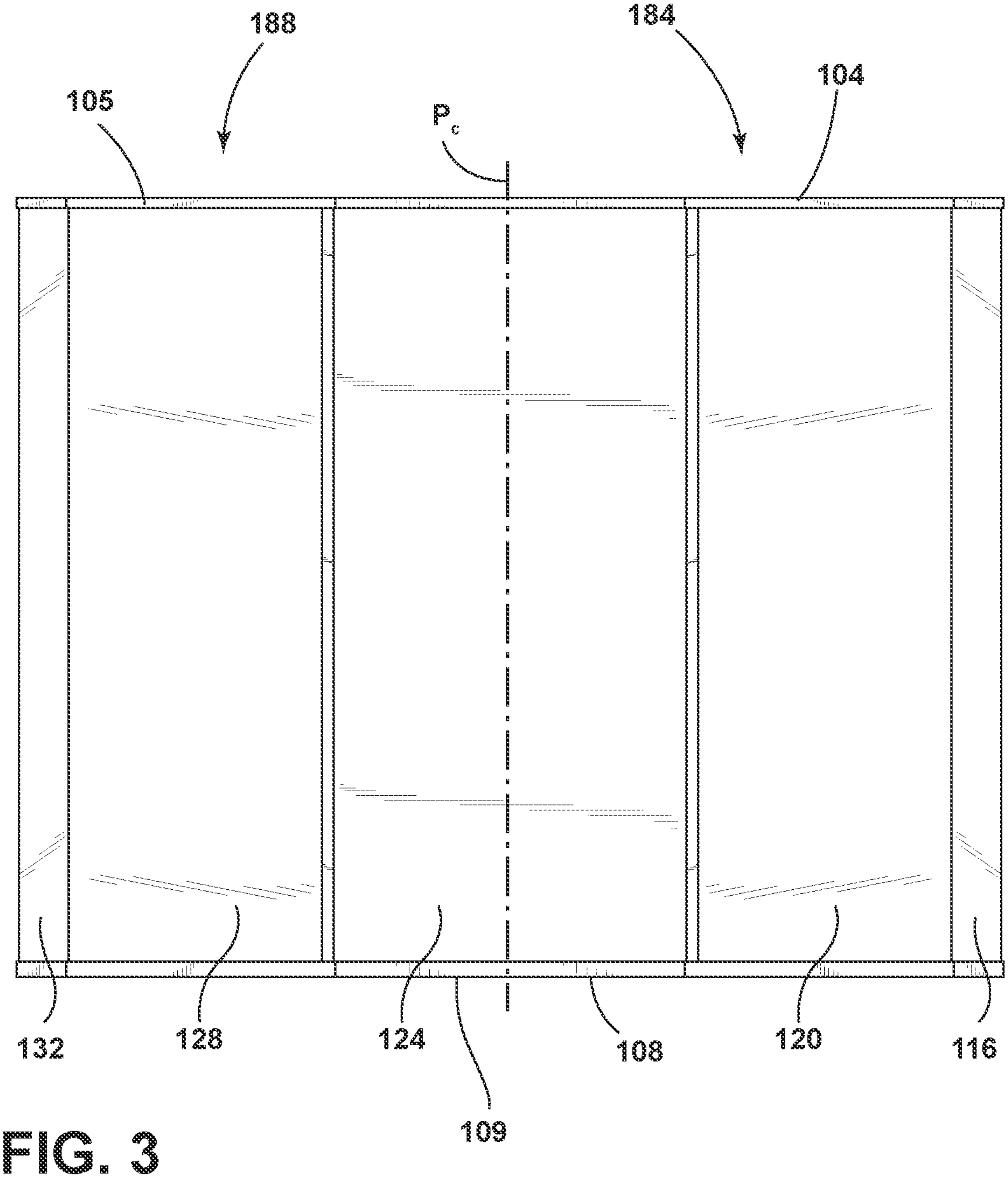
FIG. 3 is a rear elevation view of the loudspeaker in FIG. 1.
Figure 4:
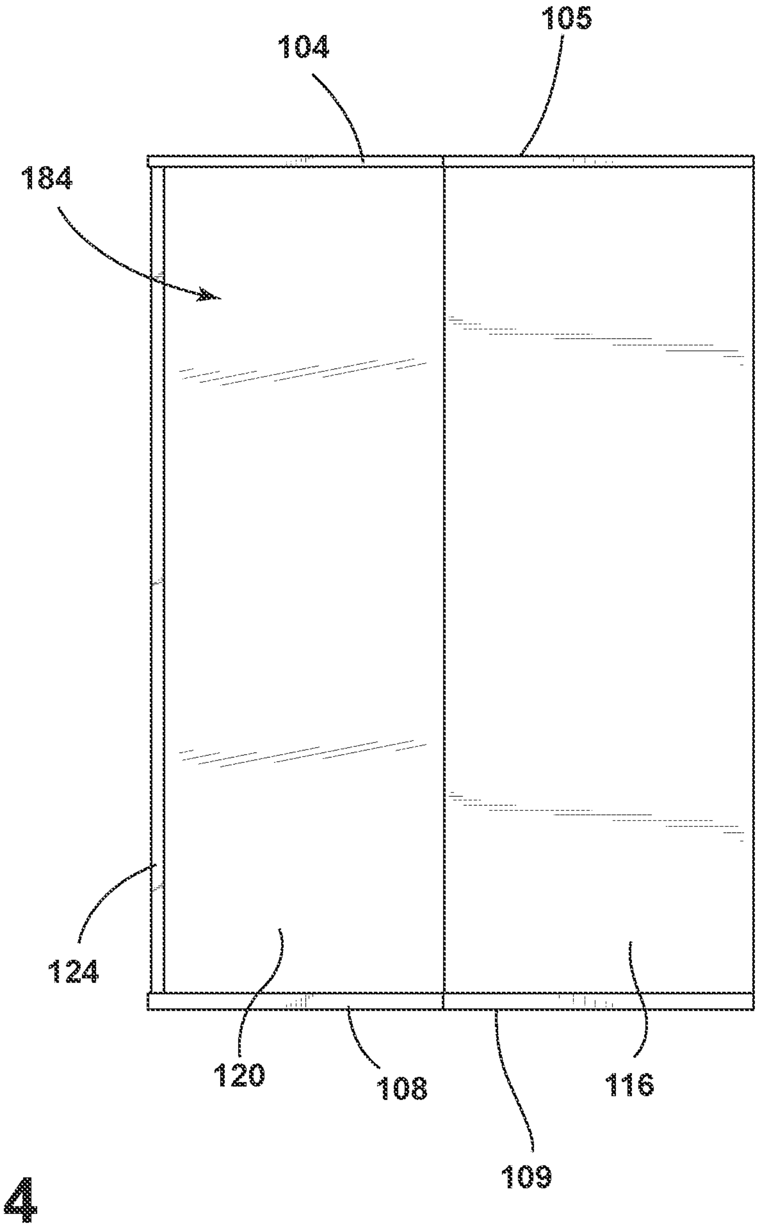
FIG. 4 is a left side elevation view of the loudspeaker in FIG. 1.
Figure 5:
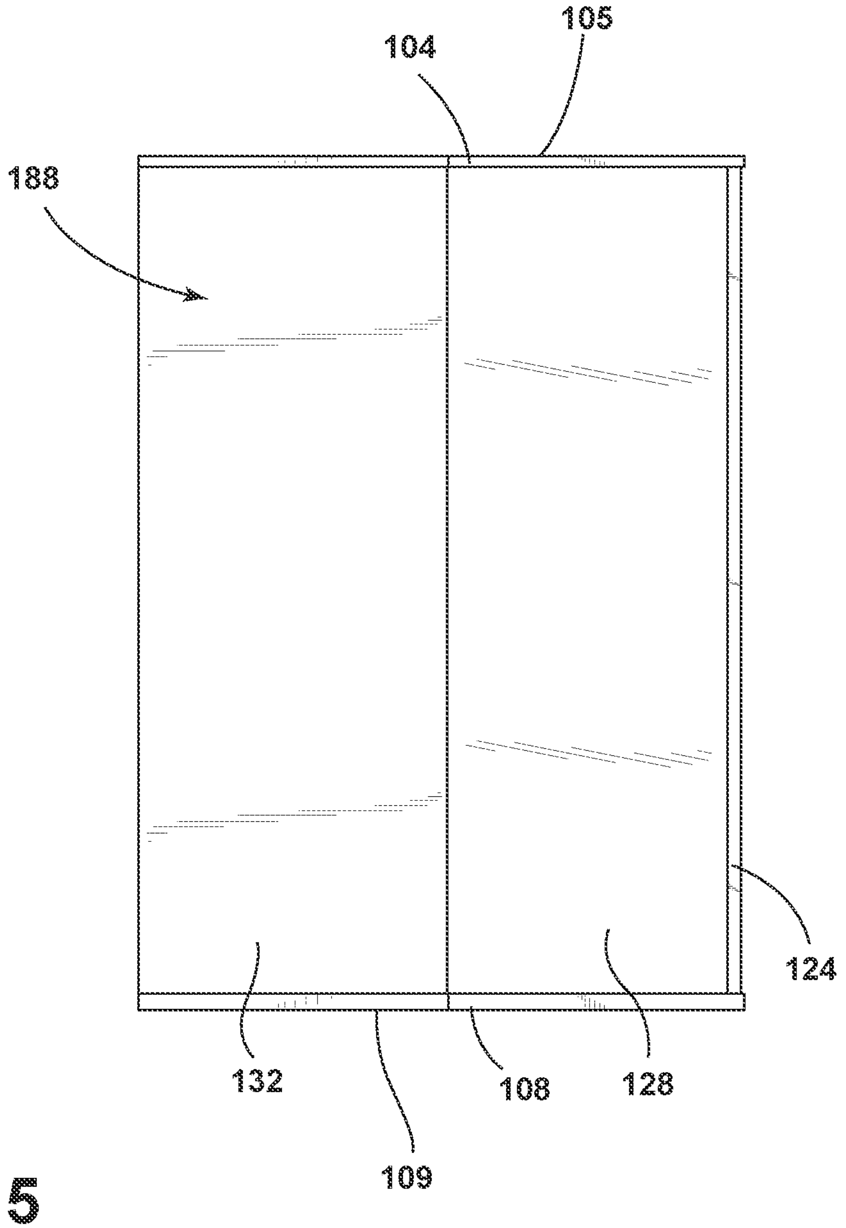
FIG. 5 is a right side elevation view of the loudspeaker in FIG. 1.
Figure 6:
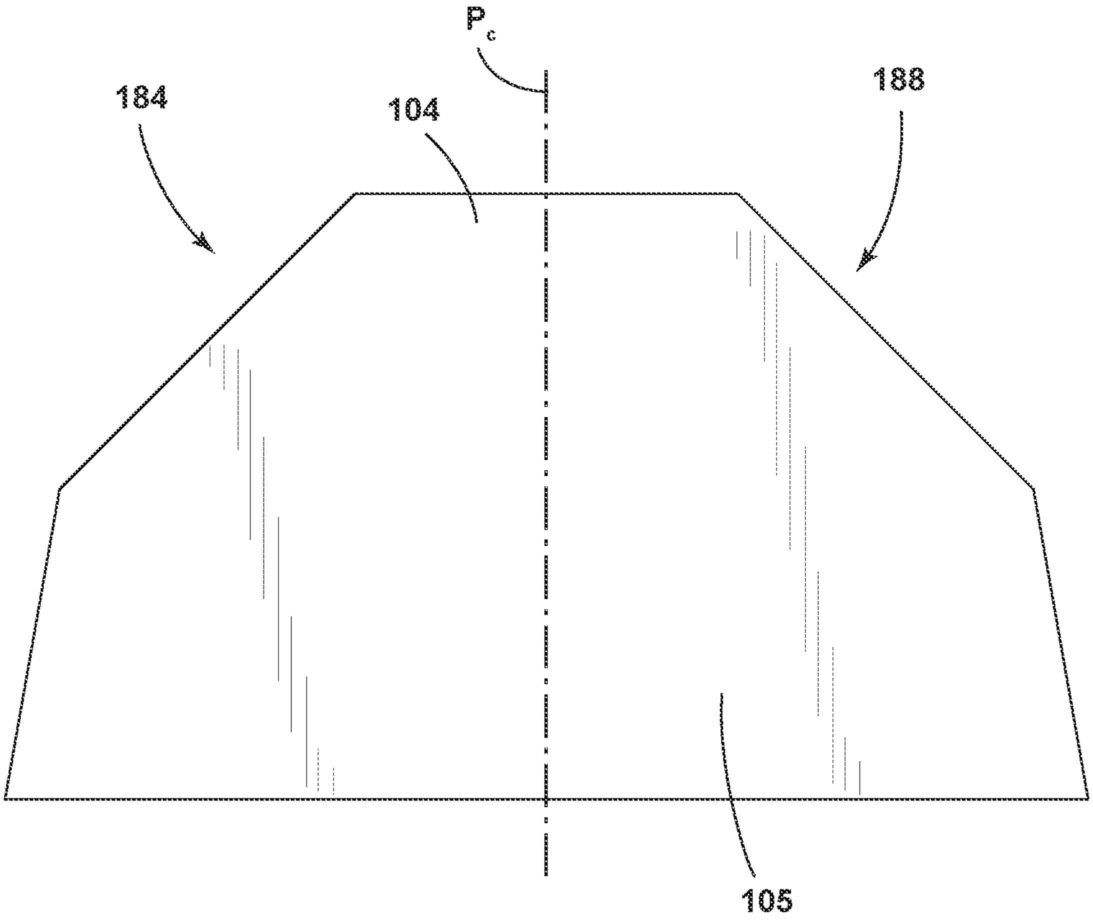
FIG. 6 is a top plan view of the loudspeaker in FIG. 1.
Figure 7:
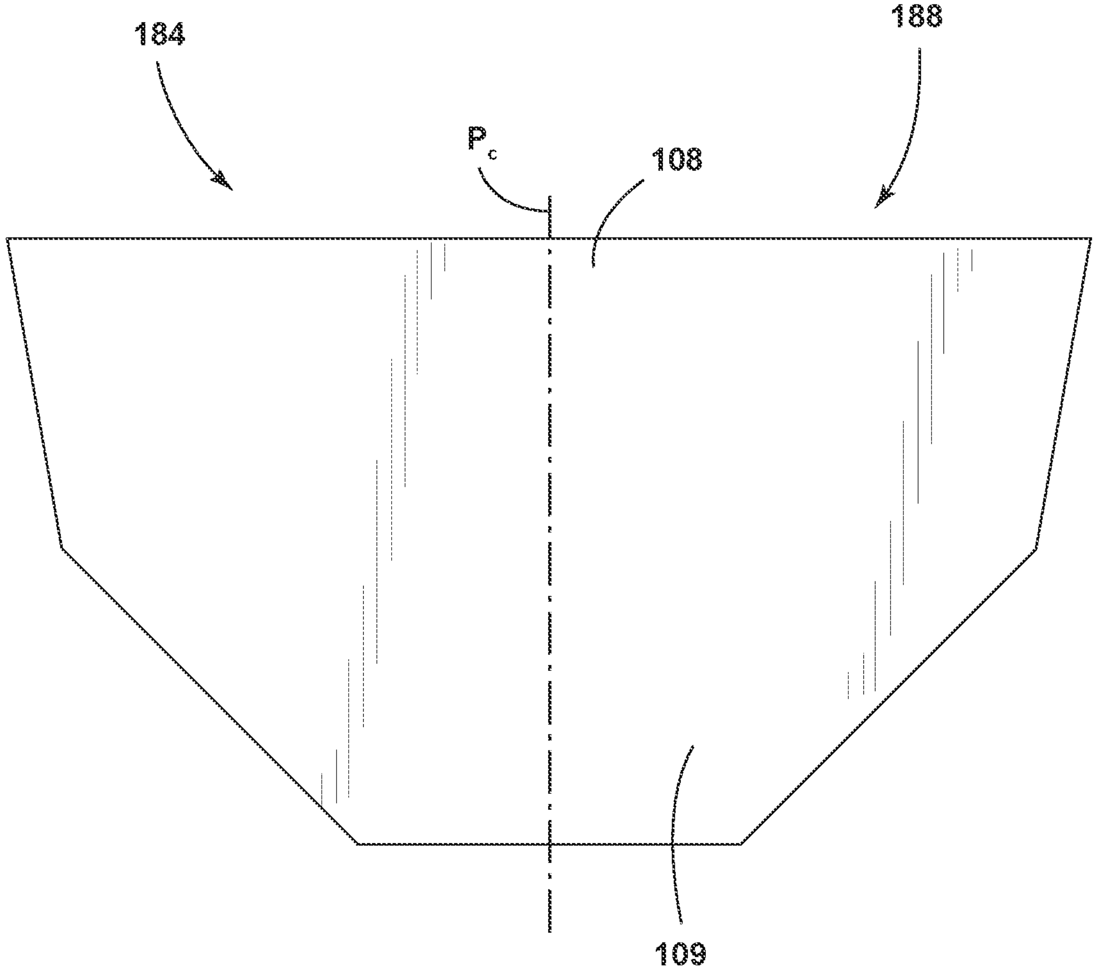
FIG. 7 is a bottom plan view of the loudspeaker in FIG. 1.
Figure 8:
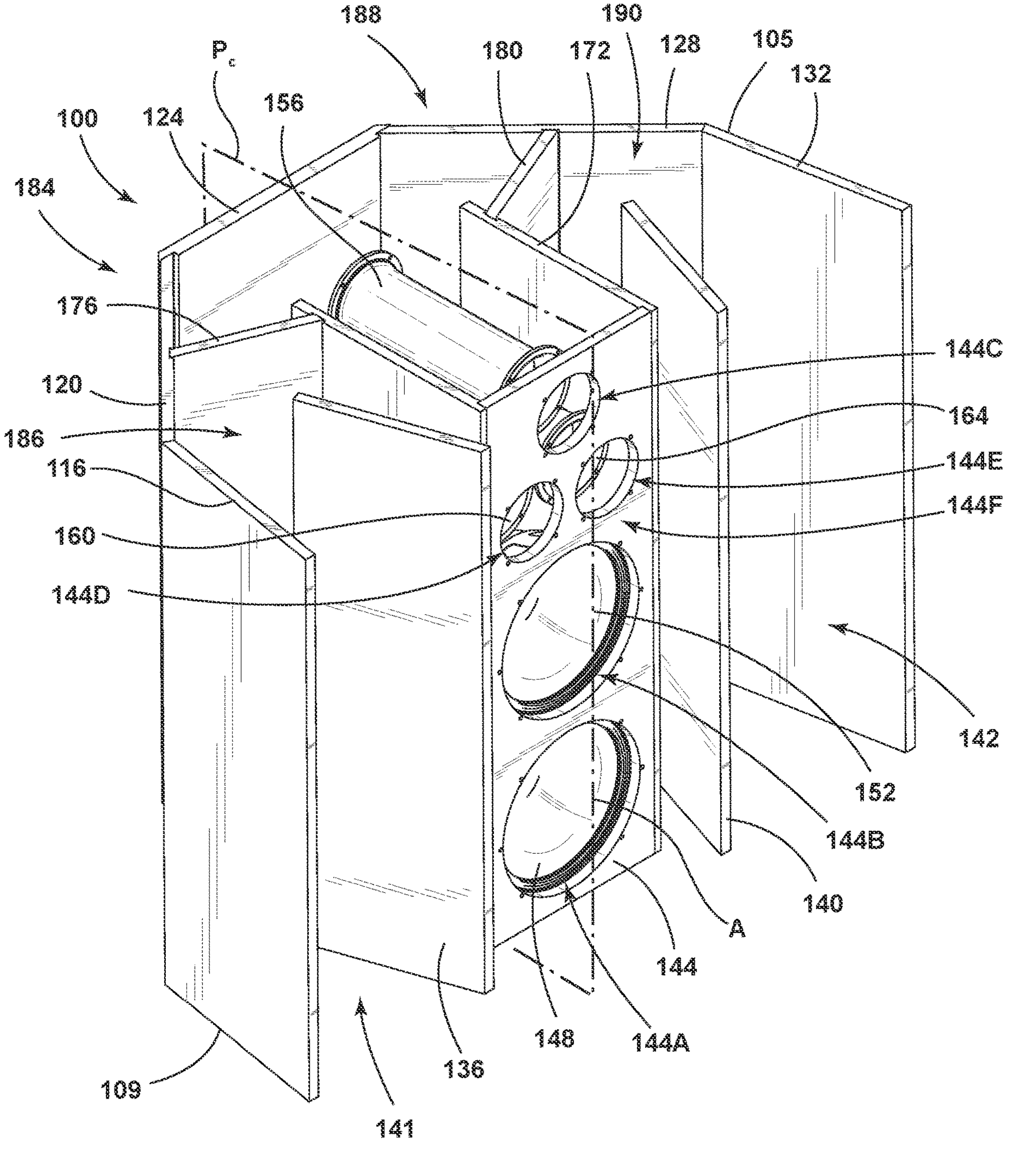
FIG. 8 is a top left perspective view of the loudspeaker in FIG. 1 having certain components removed.

Before any embodiments are explained in detail, it is to be understood that the embodiments of the disclosure are not limited in application to the details of construction and the arrangement of components set forth in the following description or illustrated in the following drawings. The embodiments disclosed herein are capable of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

The terms "about" and "approximately," as used herein, refer to variations in the numerical quantity that may occur, for example, through typical measuring and manufacturing procedures; through inadvertent error in manufacturing processes; through difference in the manufacture, source, or materials used to make the articles of manufacture described herein; and the like. Throughout the disclosure, the terms "about" and "approximately" may refer to a range of values ±5% of the numerical values that the term proceeds. Accordingly, about 100 refers to a range between 95 and 105, inclusive. The use of the terms "first," "second," "third," "fourth," "fifth," etc. are merely for illustrative purposes and are not intended to be construed as representing specific elements disclosed herein.

FIGS. 1-7 collectively illustrate an exemplary embodiments of a loudspeaker 100 having coplanar horn-loaded active components and passive components. FIGS. 8-12 illustrate the loudspeaker having certain components removed as to better illustrate other components. Thus, while certain views may better show certain components, the following description may refer to all of FIGS. 1-12.

Referring to FIGS. 1-7, in some embodiments, the loudspeaker 100 can include an upper or first sidewall 104, a lower or second sidewall 108, a front or third sidewall 112, a left or fourth sidewall 116, a fifth sidewall 120, a sixth sidewall 124, a seventh sidewall 128, a right or eighth sidewall 132, a ninth sidewall 136, and a tenth sidewall 140. In some embodiments, the loudspeaker 100 can include an eleventh sidewall 176 and a twelfth sidewall 180, which will be described further below. In some embodiments, each of the first sidewall 104, the second sidewall 108, the third sidewall 112, the fourth sidewall 116, the fifth sidewall 120, the sixth sidewall 124, the seventh sidewall 128, the eighth sidewall 132, the ninth sidewall 136, and the tenth sidewall 140 can each be a panel.

In some embodiments, the panels 104, 108, 112, 116, 120, 124, 128, 132, 136, 140 can be wood panels, plastic panels, fiberboard panels, veneer-covered fiberboard panels, and/or another suitable rigid material. Alternatively, in some embodiments, the panels (specifically, the panels 112, 168, 176, 120, 116, 172, 180, 128, and 132) can be curved to accurately approximate the flare rate of a horn. Each of the sidewalls 104, 108, 112, 116, 120, 124, 128, 132, 136, 140 can be a generally rectangular prism. The first sidewall 104, the second sidewall 108, the third sidewall 112, the fourth sidewall 116, the fifth sidewall 120, the sixth sidewall 124, the seventh sidewall 128, and the eighth sidewall 132 can form an enclosure of the loudspeaker 100. The first sidewall 104 and the second sidewall 108 can be a top panel and a bottom panel, respectively, of the loudspeaker 100. In some embodiments, the fourth sidewall 116 can be coupled to the fifth sidewall 120, the fifth sidewall 120 can be coupled to the sixth sidewall 124, the sixth sidewall 124 can be coupled to the seventh sidewall 128, the seventh sidewall 128 can be coupled to the eighth sidewall 132, the ninth sidewall 136 can be coupled to the third sidewall 112, and the third sidewall 120 can be coupled to the tenth sidewall 140.

The enclosure may include a first enclosure opening 141 and a second enclosure opening 142 (as shown in, for example, FIG. 1). The first enclosure opening 141 may be defined by the front sidewall 112, the upper sidewall 104, the lower sidewall 108, and the left sidewall 116. The second enclosure opening 142 may be defined by the front sidewall 112, the upper sidewall 104, the lower sidewall 108, and the right sidewall 132. Generally, the first enclosure opening 141 and the second enclosure opening 142 are where sound waves are configured to be released from the loudspeaker 100 into an ambient environment.

In some embodiments, the first sidewall 104 can be arranged at a first end of the loudspeaker (i.e., a top end 105) and orthogonally with respect to each of the third sidewall 112, the fourth sidewall 116, the fifth sidewall 120, the sixth sidewall 124, the seventh sidewall 128, and the eighth sidewall 132. In some embodiments, the second sidewall 108 can be arranged at a second end of the loudspeaker (i.e., a bottom end 109) and orthogonally with respect to each of the third sidewall 112, the fourth sidewall 116, the fifth sidewall 120, the sixth sidewall 124, the seventh sidewall 128, and the eighth sidewall 132. Thus, the first sidewall 104 and the second sidewall 108 can be arranged in a parallel configuration with respect to one another. The first sidewall 104 and the second sidewall 108 can be coupled to each of the third sidewall 112, the fourth sidewall 116, the fifth sidewall 120, the sixth sidewall 124, the seventh sidewall 128, the eighth sidewall 132, the ninth sidewall 136, and the tenth sidewall 140. In some embodiments, each of the sidewalls included in the loudspeaker can be coupled to at least one other sidewall via a screw, a peg, glue, and/or another suitable fastener.

Referring now to FIGS. 8-12 as well as FIGS. 1-7, in some embodiments, the loudspeaker 100 can further include a motorboard 144, an active component 148, a passive component 156, a thirteenth sidewall 168, and/or a fourteenth sidewall 172. The motorboard 144 can include an opening 144A for the active component 148 and an opening 144C for the passive component 156. In some embodiments, the loudspeaker 100 can include multiple active components and/or multiple passive components. In some embodiments, the loudspeaker 100 can include the active component 148, which may be referred to as the first active component 148, a passive component 156, which may be referred to as the first passive component 156, a second active component 152, a second passive component 160, and/or a third passive component 164.

In some embodiments, the motorboard 144 can include the active component opening 144A, which may be referred to as the first opening 144A, a second opening 144B, the passive component opening 144C, which may be referred to as the third opening 144C, a fourth opening 144D, and a fifth opening 144E. In some embodiments, each of the first active component 148, the second active component 152, the first passive component 156, the second passive component 160, and the third passive component 164 can be positioned over the first opening 144A, the second opening 144B, the third opening 144C, the fourth opening 144D, and the fifth opening 144E, respectively. Each of the first active component 148, the second active component 152, the first passive component 156, the second passive component 160, and the third passive component 164 can be positioned to transmit sound directly, or centrally, through the first opening 144A, the second opening 144B, the third opening 144C, the fourth opening 144D, and the fifth opening 144E, respectively. Further, each of the first active component 148, the second active component 152, the first passive component 156, the second passive component 160, and the third passive component 164 can be positioned concentrically with respect to the first opening 144A, the second opening 144B, the third opening 144C, the fourth opening 144D, and the fifth opening 144E, respectively.

In some embodiments, each of the first active component 148, the second active component 152, the first passive component 156, the second passive component 160, and the third passive component 164 can be in contact with the motorboard 144 at the respective opening 144A, 144B, 144C, 144D, 144E in the motorboard 144. In some embodiments, the openings 144A, 144B, 144C, 144D, 144E may be circular cutouts since circles are the most efficient shapes in terms of area, and allow for a maximum amount of sound waves to be emitted therethrough. Alternatively, the openings 144A, 144B, 144C, 144D, 144E may be ovular, or polygonal.

In some embodiments, the first active component 148 and/or the second active component 152 can be a driver. In some embodiments, the driver can be a subwoofer, woofer, mid range, and/or tweeter. In a preferred embodiment, the driver is a woofer. In some embodiments, the first passive component 156, the second passive component 160, and/or the third passive component 164 can be passive components such as vents, ports, drones, and/or radiators. In a preferred embodiment, the passive components 156, 160, and 164 are ports because ports have the advantage of being easy to vent.

Referring to FIGS. 1-12, in some embodiments, the eleventh sidewall 176 can be coupled to the fifth sidewall 120 and the thirteenth sidewall 168. Specifically, the eleventh sidewall 176 can be coupled to a first face of the thirteenth sidewall 168. In some embodiments, the motorboard 144 can be coupled to a second face of the thirteenth sidewall 168. The second face of the thirteenth sidewall 168 can face away from the first face of the thirteenth sidewall 168. For example, the first face and the second face of the thirteenth sidewall 168 can be arranged opposite each other. The motorboard 144 can be orthogonally coupled to the second face of the thirteenth sidewall 168 at a ninety degree angle. Alternatively, in some embodiments, the motorboard 144 may be coupled to the second face of the thirteenth sidewall 168 at another angle to approximate the flare rate of a horn.

In some embodiments, the twelfth sidewall 180 can be coupled to the seventh sidewall 128 and the fourteenth sidewall 172. Specifically, the twelfth sidewall 180 can be coupled to a first face of the fourteenth sidewall 172. In some embodiments, the motorboard 144 can be coupled to a second face of the fourteenth sidewall 172. The second face of the fourteenth sidewall 172 can face away from the first face of the fourteenth sidewall 172. For example, the first face and the second face of the fourteenth sidewall 172 can be arranged opposite each other. The motorboard 144 can be orthogonally coupled to the second face of the fourteenth sidewall 172 at a ninety degree angle.

The illustrated embodiment of the present disclosure uses a 20 Hz flare rate, quasi-eighth space, bifurcated folded horn design to improve efficiency of the loudspeaker 100, while having the added benefit of a compact ergonomic design that is beneficial for packing, shipping, and storing the loudspeaker 100. In alternative embodiments, it is contemplated that the loudspeaker 100 can use an acoustically equivalent 20 Hz flare rate straight horn design that extends orthogonally outward from a planar surface of the motorboard 144. The acoustically equivalent 20 Hz flare rate straight horn design may have a length (i.e. a distance measurement along the direction that the horn extends orthogonally outward from the planar surface of the motorboard 144) determined by the flare rate equation of the horn. Further, in alternative embodiments, it is contemplated that the loudspeaker 100 could use a 20 Hz flare rate horn design that is folded to one side of the motorboard, instead of a bifurcated folded horn design (as shown in FIGS. 1-12) that is folded to two laterally opposing sides of the motorboard. However, and as previously discussed, a bifurcated folded horn design is preferred for the commercial advantages of being easy to package, ship, and store (either in a warehouse, store, or consumer's location).

While the illustrated embodiment uses a 20 Hz flare rate horn, teachings of the present disclosure may be applied to other frequency flare rate horns, and other full space acoustic horns, or any fraction of full space acoustic horns, that may be used with loudspeakers by, for example, modifying dimensions of the panels 104, 108, 112, 116, 120, 124, 128, 132, 136, 140, 168, 172, 176, 180, adding additional panels, removing existing panels, and/or modifying angles between panels that are coupled together.

Figure 11:
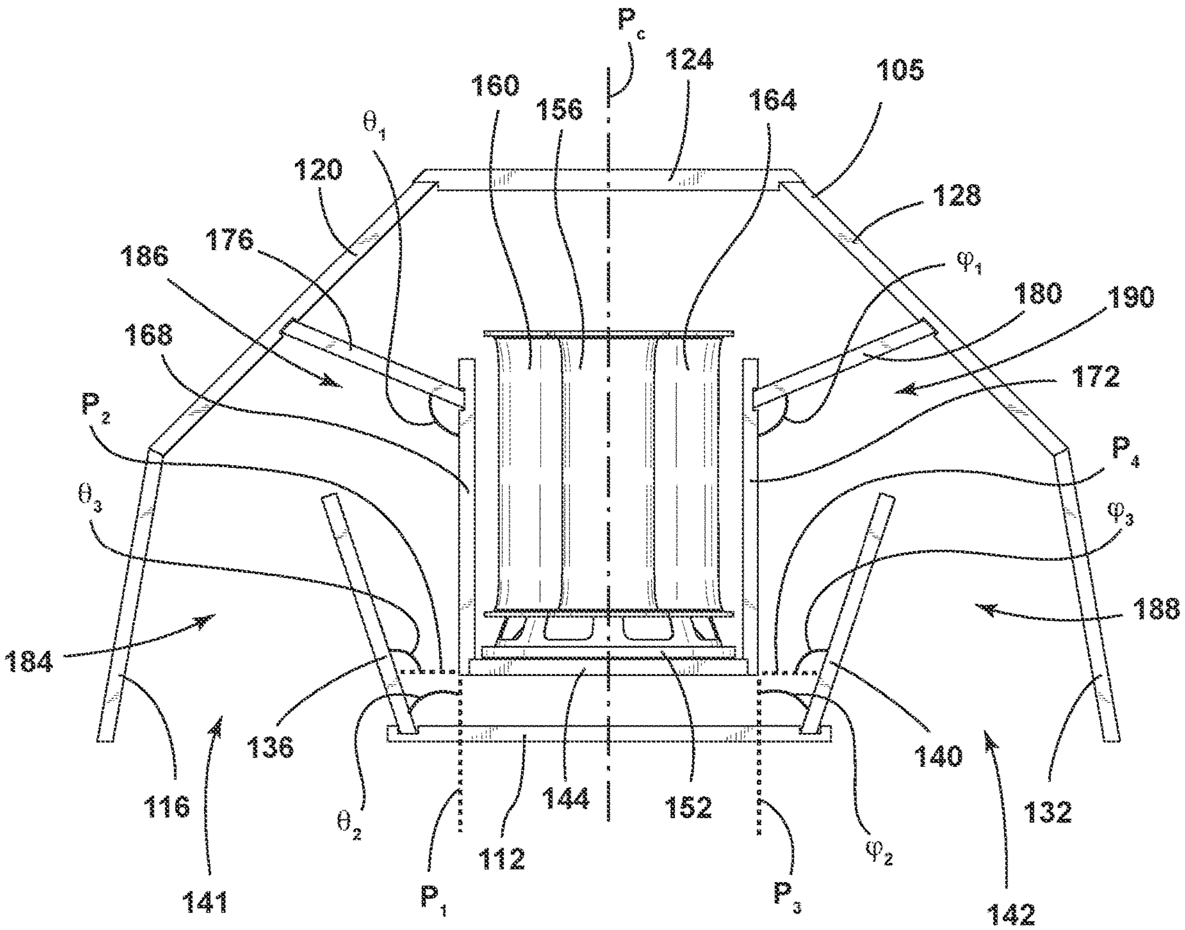
FIG. 11 is a top plan view of the loudspeaker in FIG. 8 having certain components reattached.
Figure 12:
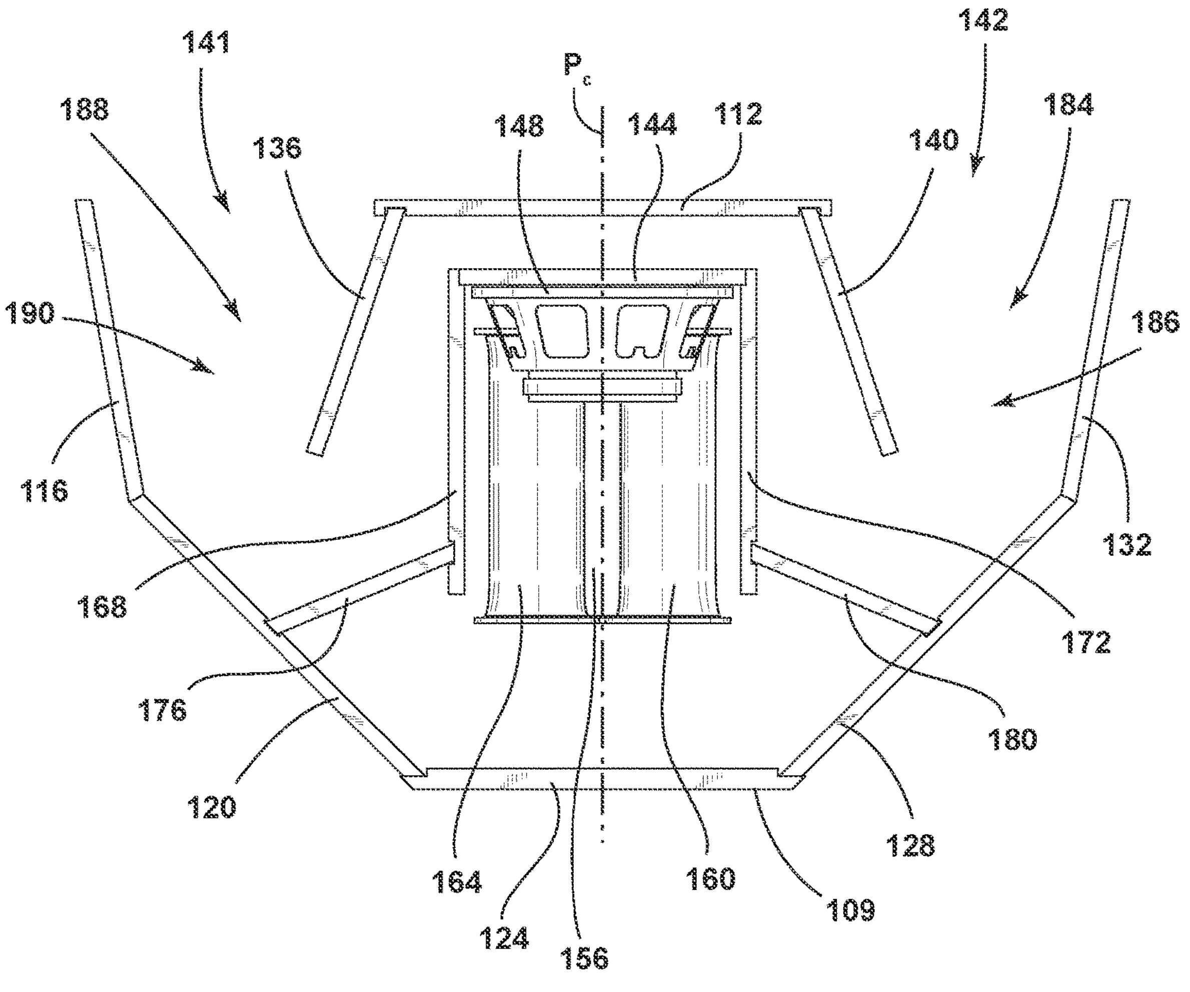
FIG. 12 is a bottom plan view of the loudspeaker in FIG. 8 having certain components reattached.

As shown, for example, in FIGS. 11 and 12, a first half of the bifurcated horn design of the loudspeaker 100 is formed by the third sidewall 112, the ninth sidewall 136, the thirteenth sidewall 168, the eleventh sidewall 176, the fifth sidewall 120, and the fourth sidewall 116. A second half of the bifurcated horn design of the loudspeaker 100 is formed by the third sidewall 112, the tenth sidewall 140, the fourteenth sidewall 172, the twelfth sidewall 180, the seventh sidewall 128, and the eighth sidewall 132. In some embodiments, the eleventh sidewall 176 can extend away from the thirteenth sidewall 168 at an angle $\theta_1$ of approximately 120 degrees. In some embodiments, the twelfth sidewall 180 can extend away from the fourteenth sidewall 172 at an angle $\varphi_1$ of approximately 120 degrees. In some embodiments, the ninth sidewall 136 can extend away from a plane $P_1$ formed by the first face of the thirteenth sidewall 168 at an angle $\theta_2$ of approximately 30 degrees. In some embodiments, the ninth sidewall 136 can extend away from a plane $P_2$ formed by a front face of the motorboard 144 at an angle $\theta_3$ of between approximately 130 degrees and approximately 95 degrees. In some embodiments, the tenth sidewall 140 can extend away from a plane $P_3$ formed by the first face of the fourteenth sidewall 172 at an angle $\varphi_2$ of approximately 30 degrees. In some embodiments, the tenth sidewall 140 can extend away from a plane $P_4$ formed by a front face of the motorboard 144 at angle $\varphi_3$ of between approximately 130 degrees and approximately 95 degrees.

It is noted that the relative angles of the sidewalls discussed with regard to embodiments of the present disclosure were chosen to approximate a flare rate of a 20 Hz flare rate horn, while also considering assembly and manufacturing costs. Some embodiments of the present disclosure may include more panels than those illustrated in FIGS. 1-12, and/or curved panels to minimize error in approximating a flare rate of a horn. However, such embodiments may be costly to assemble or manufacture parts therefor. As such, the preferred embodiment (illustrated in FIGS. 1-12) uses enough panels to satisfactorily approximate the flare rate of a horn, while also being easy to manufacture and assemble.

The horn can provide an efficient and accurate housing for the active and passive components of the loudspeaker 100. In particular, the motorboard 144 can allow for the coplanar mounting of active and passive components, such as the passive components 156, 160, 164, and the active components 148, 152 of embodiments of the present disclosure. Specifically, an edge of each of the openings 144A, 144B, 144C, 144D, 144E can be co-planar with a planar surface of the motorboard 144. In the past, horn-loaded loudspeakers did not utilize coplanar mounted passive and active components. Due to tuning issues, the active components had to be arranged along one plane, and the passive components had to be arranged along a second plane disposed an angle offset from the first plane, i.e., at an angle of greater than 0 degrees and less than 180 degrees. Generally, passive components, such as ports or drone, may be tuned by selecting a desired diameter and length for the passive component.

However, the embodiments disclosed herein utilize a single plane along which both the active components 148, 152 and the passive components 156, 160, 164 are arranged. By placing the active components 148, 152 and the passive components 156, 160, 164 in the same plane, crosstalk is reduced between the active components 148, 152 and the passive components 156, 160, 164 during use of the loudspeaker 100.

In some embodiments, the horn (i.e. the horn formed by the third sidewall 112, the ninth sidewall 136, the thirteenth sidewall 168, the eleventh sidewall 176, the fifth sidewall 120, the fourth sidewall 116, the tenth sidewall 140, the fourteenth sidewall 172, the twelfth sidewall 180, the seventh sidewall 128, and the eighth sidewall 132) can be an exponential horn, a conical horn, a hyperbolic horn, a Tractrix horn, and/or combinations thereof. Generally, active components and passive components are able to share a horn, without negatively impacting acoustic performance, when the passive components and the active components operate on different bandwidths. In some embodiments of the present disclosure, the active components 148, 152 and the passive components 156, 160, 164 operate on different bandwidths and share the horn. For example, in some embodiments, the active components 148, 152 produce sound waves greater than 30 Hz, and the passive component 156, 160, 164 produce sound waves less than 30 Hz. The ability for the active components 148,152 and the passive components 156, 160, 164 to share the same horn contributes to the compact ergonomic design of the loudspeaker 100.

Figure 9:
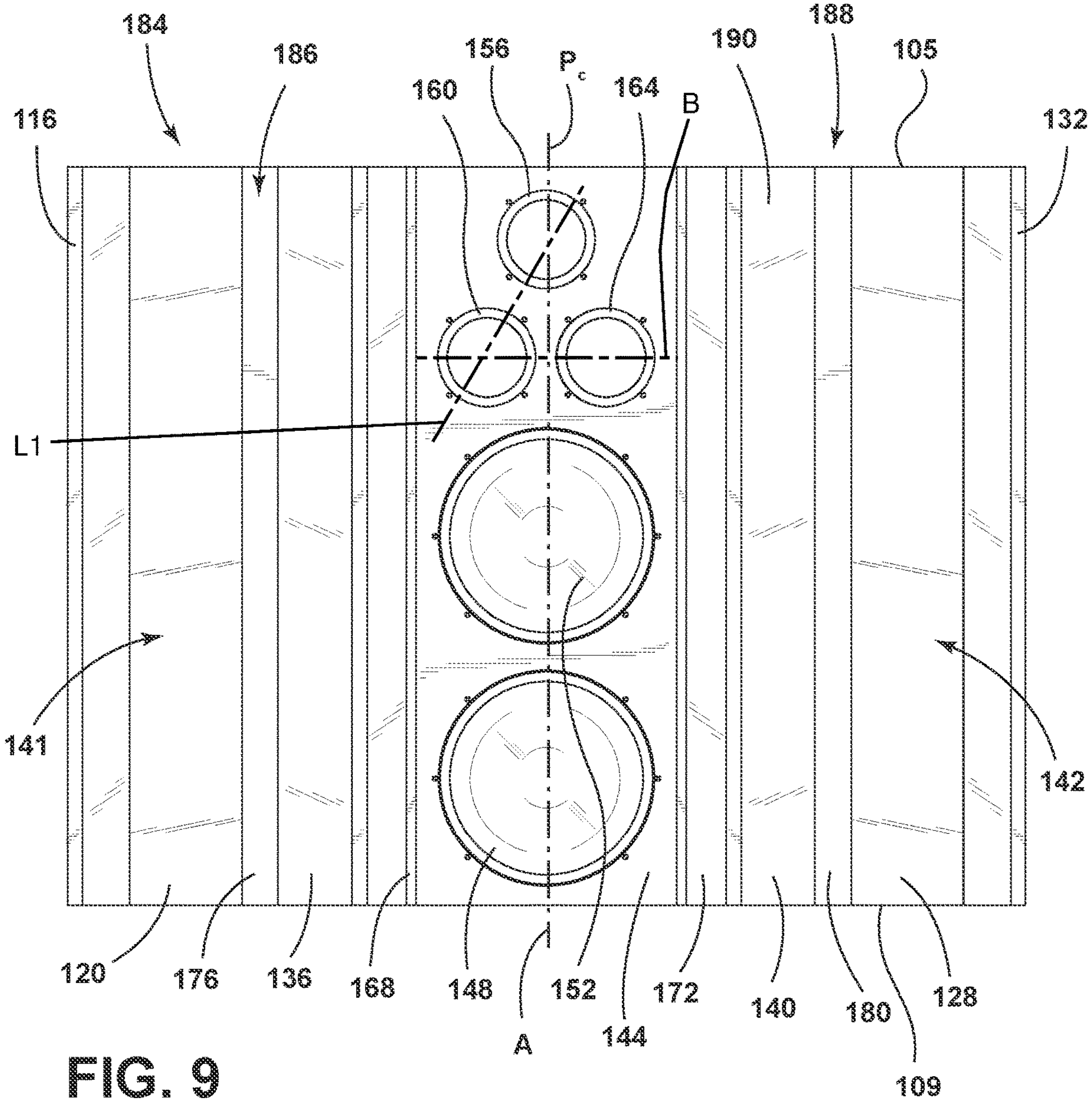
FIG. 9 is a front elevation view of the loudspeaker in FIG. 8.
Figure 10:
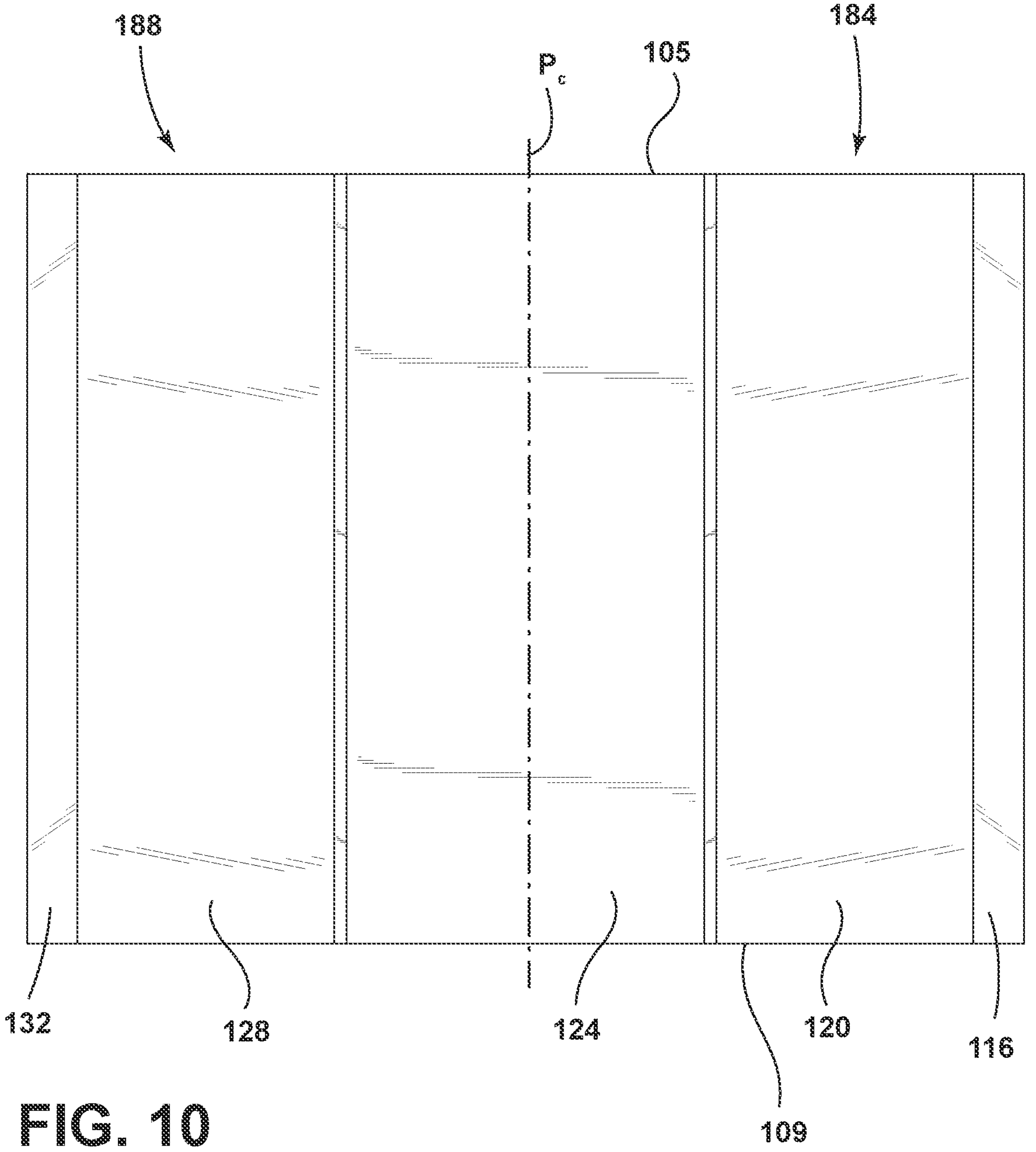
FIG. 10 is a rear elevation view of the loudspeaker in FIG. 8.

Referring to FIG. 9 in particular, in some embodiments, the second passive component 160 and the third passive component 164 (and their respective openings) can be arranged collinearly along a length L1 and/or a width of the motorboard 144, e.g., such that reference axis B intersects a geometric center point of each of the second passive component 160 and the third passive component 164 (and their respective openings). In some embodiments, the first passive component 156, the first active component 148, and the second active component 152 (and their respective openings) can be arranged collinearly along a length of the motorboard 144; specifically, a center point of an end nearest to the motorboard 144 of each of the first passive component 156, the first active component 148, and the second active component 152 can be arranged collinearly along a length of the motorboard 144. A center line A (see FIG. 8) may be defined through the geometric center point of the first opening 144A, the second opening 144B, and the third opening 144C. A center plane Pc (see FIG. 8) may extend through the center line A and orthogonal to the motorboard 144 (i.e. extending perpendicularly from the page in FIGS. 2, 3, 9, and 10), such that the center line A and the center plane Pc are disposed orthogonal to the reference axis B. The center plane Pc may separate the loudspeaker 100 into a first loudspeaker part or half 184 and a second loudspeaker part or half 188. The first half 186 of the bifurcated horn may be disposed in the first loudspeaker half 184, and the second half 190 of the bifurcated horn may be disposed in the second loudspeaker half 188. The first half of the bifurcated horn 186 may define a first acoustic passage. The second half of the bifurcated horn 190 may define a second acoustic passage. Generally, an acoustic passage may be a cavity defined by panels that sounds waves travel through from an active or passive component. The first acoustic passage may be in fluid communication with the second acoustic passage (e.g. the first half of the bifurcated horn 186 may be in fluid communication with the second half of the bifurcated horn 190).

The first acoustic passage may extend from the center plane $P_c$ to the first opening 141 of the enclosure (e.g. from the center plane $P_c$, around the ninth sidewall 136, and to the opening defined by the front sidewall 112, the upper sidewall 104, the lower sidewall 108, and the left sidewall 116). The second acoustic passage may extend from the center plane to the second opening of the enclosure (e.g. from the center plane, around the tenth sidewall 140, and to the opening defined by the front sidewall 112, the upper sidewall 104, the lower sidewall 108, and the eighth sidewall 132). Further, the first acoustic passage may define a first volume (e.g. the geometric volume formed between the center plane, the front sidewall 112, the motorboard 144, the ninth sidewall 136, the thirteenth sidewall 168, the eleventh sidewall 176, the fifth sidewall 120, the fourth sidewall 116, the upper sidewall 104, and the lower sidewall 108), and the second acoustic passage may define a second volume (e.g. the geometric volume formed between the center plane, the front sidewall 112, the motorboard 144, the tenth sidewall 140, the fourteenth sidewall 172, the twelfth sidewall 180, the seventh sidewall 120, the eighth sidewall 116, the upper sidewall 104, and the lower sidewall 108). In some embodiments, the first volume may be approximately equivalent (e.g. the same) as the second volume.

In some embodiments, a loudspeaker can include an enclosure, a horn including a motorboard, and at least one passive component and one active component arranged on a common plane over openings in the motorboard. In other words, the present disclosure provides for a number of horn-loaded loudspeakers having coplanar active components and passive components.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of any patent and publication cited herein is incorporated by reference, as if each such patent or publication were individually incorporated by reference herein. Various features and advantages of the invention are set forth in the following claims.

I claim:

1. A loudspeaker comprising:

an enclosure comprising a front sidewall that is disposed between a first acoustic opening and a second acoustic opening;

a motorboard comprising a first opening arranged along a plane and a second opening arranged along the plane;

an active driver arranged concentric to the first opening to transmit sound waves directly through the first opening toward the front sidewall; and a passive component arranged concentric to the second opening to transmit sound waves directly through the second opening toward the front sidewall.

2. The loudspeaker of claim 1 further comprising a second passive component, and wherein the motorboard comprises a third opening, the second passive component being arranged concentric to the third opening to transmit sound waves directly through the third opening toward the front sidewall.

3. The loudspeaker of claim 2 further comprising a third passive component, and wherein the motorboard comprises a fourth opening, the third passive component being arranged concentric to the fourth opening to transmit sound waves directly through the fourth opening toward the front sidewall.

4. The loudspeaker of claim 1 further comprising a second active driver, and wherein the motorboard comprises a third opening, the second active driver being arranged concentric to the third opening to transmit sound waves directly through the third opening toward the front sidewall.

5. The loudspeaker of claim 1 further comprising a horn including a first acoustic passage and a second acoustic passage that are in fluid communication with one another.

6. The loudspeaker of claim 5, wherein the first acoustic passage of the horn extends from the front sidewall to the first acoustic opening and the second acoustic passage extends from the front sidewall to the second acoustic opening.

7. The loudspeaker of claim 1, wherein the active driver comprises a woofer.

8. The loudspeaker of claim 1, wherein the passive component comprises a vent.

9. A loudspeaker, comprising:

an enclosure comprising a front sidewall that is disposed between a first acoustic opening and a second acoustic opening;

a motorboard comprising a first opening that defines a first center point and a second opening that defines a second center point, wherein the first opening and the second opening are co-planar;

a center plane that is orthogonal to a planar surface of the motorboard, the center plane defining a first part of the enclosure and a second part of the enclosure, wherein the first center point is intersected by the center plane and the second center point is offset from the center plane;

an active driver arranged concentric to the first opening to transmit sound waves directly through the first opening; and at least three passive components each configured to transmit sound waves directly through a corresponding opening toward the front sidewall, including a first passive component arranged concentric to the second opening to transmit sound waves directly through the second opening, wherein a first acoustic passage is disposed in the first part of the enclosure, the first acoustic passage being configured to transmit sound waves from the center plane to first acoustic opening of the enclosure.

10. The loudspeaker of claim 9, wherein a second acoustic passage is disposed in the second part of the enclosure, the second acoustic passage being configured to transmit sound waves from the center plane to the second acoustic opening of the enclosure.

11. The loudspeaker of claim 9, wherein the second opening is arranged entirely within the second part of the enclosure.

12. The loudspeaker of claim 9, wherein the motorboard comprises a third opening that defines a third center point that is intersected by the center plane, a second passive component of the at least three passive components being arranged concentric to the third opening to transmit sound waves directly through the third opening.

13. The loudspeaker of claim 9, wherein the active driver comprises a woofer and the first passive component comprises a vent.

14. A loudspeaker, comprising:

an enclosure comprising a front sidewall that is disposed between a first acoustic opening and a second acoustic opening;

a motorboard comprising a first opening that defines a first center point and a second opening that defines a second center point, wherein the first opening and the second opening are co-planar;

an active driver arranged concentric to the first opening to transmit sound waves directly through the first opening;

a first passive component arranged concentric to the second opening to transmit sound waves directly through the second opening; and a second passive component arranged concentric to a third opening to transmit sound waves directly through the third opening, wherein the third opening defines a third center point that is arranged collinearly with the second center point along a width of the motorboard, wherein a third passive component is arranged concentric to a fourth opening in the motorboard.

15. The loudspeaker of claim 14, wherein the enclosure comprises a plurality of sidewalls including the front sidewall that is opposite a rear sidewall, wherein the motorboard is disposed between the front sidewall and the rear sidewall.

16. The loudspeaker of claim 15, wherein the loudspeaker comprises at least two active drivers.

17. The loudspeaker of claim 15, wherein the first passive component, second passive component, and third passive component; are arranged in a triangular configuration, and wherein one of the first passive component, second passive component, or third passive component that is arranged concentric to the second opening, third opening, or fourth opening, respectively, of the motorboard defines a center point arranged collinearly with the first center point.

18. The loudspeaker of claim 15, wherein each of the first passive component, second passive component, and third passive component is configured to transmit sound waves directly through the second opening, third opening, and fourth opening, respectively, toward the front sidewall.

19. A loudspeaker, comprising:

an enclosure comprising a front sidewall that is disposed between a first acoustic opening and a second acoustic opening:

a motorboard comprising a first opening that defines a first center point and a second opening that defines a second center point, wherein the first opening and the second opening are co-planar;

an active driver arranged concentric to the first opening to transmit sound waves directly through the first opening; and at least three passive components each configured to transmit sound waves directly through a corresponding opening toward the front sidewall, including:

a first passive component arranged concentric to the second opening to transmit sound waves directly through the second opening; and a second passive component arranged concentric to a third opening to transmit sound waves directly through the third opening, wherein the third opening defines a third center point that is arranged collinearly with the second center point along a length L1 of the motorboard.

* * * * *